Oct. 9, 1956
E. J. NIEMEIER
2,765,942
EASY LOAD BOAT TRAILER
Filed Nov. 30, 1954
2 Sheets-Sheet 1
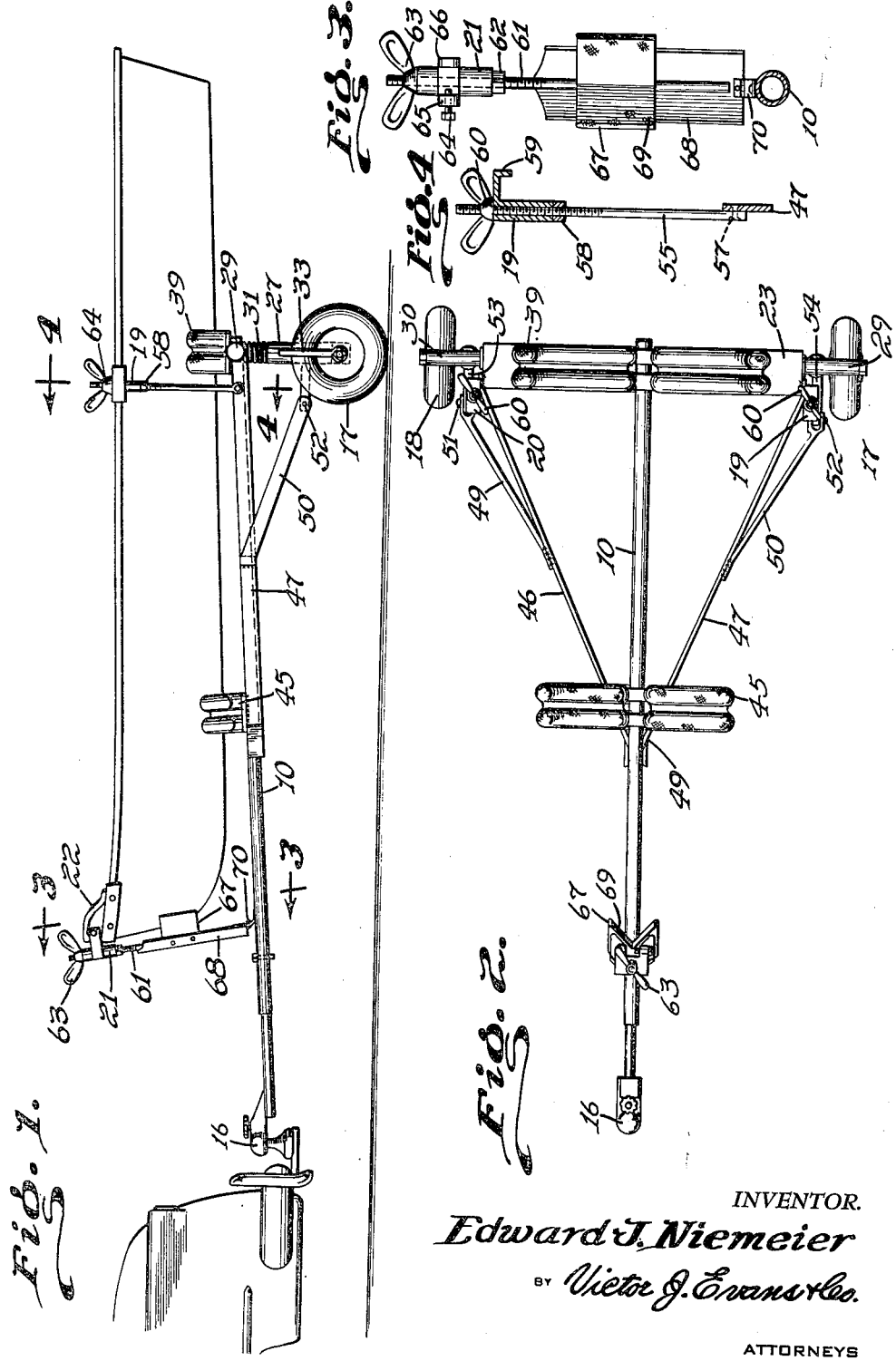
INVENTOR.
Edward J. Niemeier
BY Victor J. Evans & Co.
ATTORNEYS

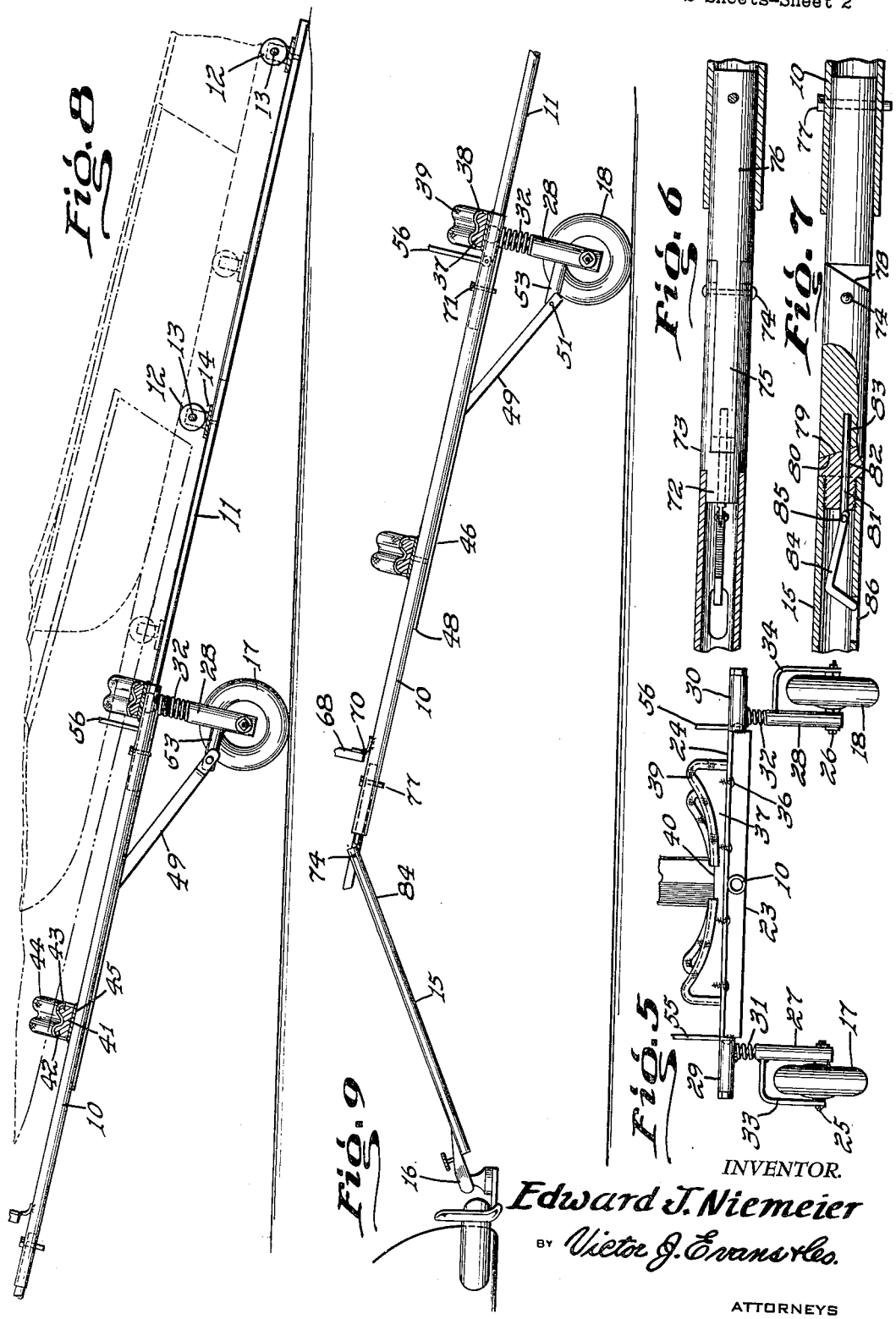

United States Patent Office 2,765,942
Patented Oct. 9, 1956

2,765,942

EASY LOAD BOAT TRAILER

Edward J. Niemeier, Evansville, Ind.

Application November 30, 1954, Serial No. 472,066

5 Claims. (Cl. 214—506)

This invention relates to trailers adapted to be connected with a hitch to a rear bumper of a motor vehicle and particularly of the two wheel type, and in particular, a trailer having both carrying saddles and clamps thereon with a telescoping connection at the forward end and also having a telescoping section with rollers thereon adapted to extend from the trailing end and in which the connection at the forward end is provided with a jack knife joint which facilitates sloping the tongue of the trailer so that a boat may readily be loaded on and also removed from the trailer.

The purpose of this invention is to provide a trailer for towing boats with a motor vehicle in which a boat may readily be loaded on and removed from a trailer by a single operator.

Various types of trailers have been provided for carrying boats on highways, however, with the conventional type, it is necessary to lift a boat above supporting elements of the trailer and this is sometimes difficult when it is necessary for an individual to load and unload the boat. With this thought in mind, this invention contemplates a boat carrying trailer having rollers on a telescoping section of a beam slidably mounted in the tongue of the trailer, a hitch connection having a jack knife joint therein slidably mounted in the forward end of the tongue and an axle having wheels on ends thereof mounted in a truss formation in which the tongue is positioned.

The object of this invention is, therefore, to provide an improved trailer for towing boats with motor vehicles in which the forward end of a tongue of the trailer is adapted to be extended upwardly to facilitate drawing a boat over rollers on a telescoping section adapted to extend from the opposite end of the tongue whereby an individual may readily remove a boat from the trailer.

Another object of the invention is to provide a boat trailer adapted to be actuated by an individual in which clamping means is provided at the bow and also at both sides of a boat positioned on the trailer.

A further object of the invention is to provide an improved trailer for towing boats with motor vehicles in which a boat may be positioned upon and removed from the trailer by an individual and in which the trailer is of a comparatively simple and economical construction.

With these and other objects and advantages in view, the invention embodies an elongated tubular tongue having cradles mounted on cross members thereof with wheels rotatably mounted in brackets extended from sides of the tongue and with telescoping members slidably mounted in opposite ends of the tongue with a telescoping member adapted to extend from the trailing end of the tongue having rollers thereon and with a telescoping member having a hitch connection on the extended end and having a jack knife joint therein adapted to be positioned in the forward end of the tongue.

Other features and advantages of the invention will appear from the following description, taken in connection with the drawings, wherein:

Figure 1 is a side elevational view illustrating the use of the improved boat trailer and showing a boat secured by clamps in saddles of the trailer.

Figure 2 is a plan view of the trailer with the telescoping connection adapted to extend from the rear of the tongue omitted.

Figure 3 is a cross section through the forward part of the trailer, taken on line 3—3 of Figure 1, with the parts shown on an enlarged scale and illustrating a wing nut actuated latch for securing the bow of the boat to the tongue of the trailer.

Figure 4 is a cross section taken on line 4—4 of Figure 1 illustrating a clamp at one side of the trailer, the boat and other parts of the trailer being omitted.

Figure 5 is a rear elevational view looking toward the end of the trailer with parts of the clamping elements thereof broken away.

Figure 6 is a sectional plan illustrating a jack knife joint in the hitch connection at the forward end of the trailer, the connecting elements in the device being shown in elevation and the parts being shown on an enlarged scale.

Figure 7 is a longitudinal section, similar to that shown in Figure 6, also with parts shown in elevation and with the parts being shown on an enlarged scale.

Figure 8 is a longitudinal section through the trailer with a telescoping section on which rollers are positioned shown in different positions as a boat is drawn rearwardly or moved forwardly on the trailer.

Figure 9 is a section, similar to that shown in Figure 8, illustrating the hitch connection at the forward end of the tongue and showing the forward end of the tongue in an elevated position.

Referring now to the drawings, wherein like reference characters denote corresponding parts, the improved trailer of this invention includes a longitudinally disposed tube 10 providing a tongue, a telescoping tube 11 having rollers 12 rotatably mounted by pins 13 in bearings 14 thereon, a rod 15 having a hitch socket 16 on the forward end slidably mounted in the forward end of the tube 10, wheels 17 and 18 positioned at the sides of the tongue, clamps 19 and 20 also positioned at the sides of the tongue and a clamp 21 positioned on the forward part of the tongue and adapted to grip a bracket 22 on the bow of the boat.

The tongue 10 is secured in a transversely disposed beam 23 having a plate 24 on the upper surface and the wheels 17 and 18 are rotatably mounted on bolts 25 and 26 extended through the lower ends of posts 27 and 28 which are slidably mounted in studs 29 and 30 extended from ends of the beam 23 and springs 31 and 32 in the connections between the posts and studs provide resiliency in the wheel mountings. The outer ends of the bolts 25 and 26 are secured in brackets 33 and 34 extended from the posts 27 and 28, respectively, as shown in Figure 5.

The plate 24 is provided with a saddle including a block 35 that is secured to the plate with screws 36 and the upper surface of the block, which is formed with ribs 37 and 38, is provided with a covering 39 of resilient material. The covering 39 is provided with a gap 40 that is positioned to receive the keel of the boat.

A similar saddle including a block 41 having ridges 42 and 43 on the upper surface and provided with sections 44 of a resilient covering material is mounted on a bar 45 on the intermediate part of the tongue 10. The rear portion of the tongue 10 is provided with braces 46 and 47 that extend from the point 48 to the ends of the beam 23, as shown in Figure 2, and the braces are provided with supports 49 and 50, bifurcated ends of which are connected by pins 51 and 52 to arms 53 and 54 that extend forwardly from the posts 27 and 28, respectively.

The clamps 19 and 20 are positioned on upper ends of rods 55 and 56 which are pivotally connected by pins 57 to the braces 46 and 47, as shown in Figure 4, and the clamps, which are located by nuts 58 threaded on the rods are provided with arms 59 that are clamped over the upper edges of the sides of the boat with wing nuts 60. By this means, the boat is secured in the saddle positioned above the wheels and with the nuts 58 positioned to limit downward movement of the clamps the arms 59 may be secured over the edges of the sides of the boat without marring the surfaces thereof. With the rods 55 and 56 pivotally connected to the braces 46 and 47, the rods may readily be folded downwardly upon the framework of the trailer when the device is not in use.

The clamp 21 is mounted in a similar manner on a threaded rod 61 which is provided with a locating nut 62 and a wing nut 63 and, as shown in Figure 3, the clamp 21 is provided with a set screw 64 for retaining the vertical section of the bracket 22 between arms 65 and 66 of the clamp. A block 67 having a V-shaped recess therein is mounted on a bar 68 on the rod 61 with fasteners 69 and the lower end of the bar 68 is secured by a hinge 70 to the upper surface of the tongue 10 whereby, when not in use, the bar 68 and rod 61 with the clamp 21 may be folded downwardly to a position upon the frame of the trailer. The block 67 may be of wood or other suitable material.

The telescoping tube 11 upon which the rollers 12 are positioned is adapted to slide into the trailing end of the tubular tongue 10 and, as illustrated particularly in Figure 9, the tongue 10 is provided with a bolt 71 that is adapted to extend through openings in the tongue and tube for retaining the telescoping tube in an extended position. It will also be understood that spaced openings may be provided in the tube 10 whereby the rollers may be secured in adjusted positions, as illustrated in Figure 8. The telescoping tube 11 with the rollers thereon may be positioned below the trailer when not in use.

The hitch connecting rod 15 is provided with a jack knife connection as illustrated in Figures 6 and 7 wherein the tubular rod is mounted on a hub 72 of a bifurcated intermediate section 73 and the section 73 is pivotally connected by a pin 74 to a tongue 75 extended from a base 76 which is adjustably held in the forward end of the tongue 10 with a pin 77. The ends of the bifurcated section or sides of the section 73 are provided with beveled surfaces 78 that permit the rod 15 to bend downwardly, as illustrated in Figure 9, when it is desired to elevate the forward end of the trailer to load a boat on the trailer or to remove a boat therefrom.

The forward end of the tongue 75 is provided with a beveled surface 79 to coact with a similar surface 80 of the section 73 and a pin 81 extended through an opening 82 in the section 73 and into an opening 83 in the tongue 75 locks the parts in the extended position, as shown in Figures 6 and 7.

The pin 81 is provided with a handle 84 that is pivotally connected to the pin 81 with a fastener 85 and the end of the handle is positioned to extend through an opening 86 in the tubular rod 15 so that the pin 81 may be withdrawn to release the tongue 75 from the connection 73 when it is desired to bend the connection to extend the forward end of the trailer frame upwardly, as shown in Figure 9.

After a boat is loaded upon, or removed from the trailer, the forward end of the trailer frame is moved downwardly to the position shown in Figure 1 and, with the pin 77 removed, the connecting elements shown in Figures 6 and 7 are adapted to slide into the tubular tongue 10 and, with the parts in position, the pin 77 is dropped through an opening in the forward part of the tubular rod 15.

With the parts designed and assembled in this manner, the forward end of the trailer frame may readily be moved upwardly with the frame in the position shown in Figures 8 and 9 whereby, with the telescoping rod 11 extended, a boat may readily be rolled upwardly upon the saddle and with the telescoping member 11 moved into the tongue 10 the rollers 12 elevate the rear portion of the boat above the saddles to facilitate sliding movement of the boat on the trailer. The rollers 12 are adapted to be used in the same manner for removing the boat whereby the boat may be moved downwardly to a position upon the ground or in the water and after the boat is removed the parts may be assembled as shown and described.

With the boat in position upon the trailer, the clamping members 19, 20 and 21 are adjusted by the wing nuts to hold the boat rigid as it is carried from one location to another.

It will be understood that modifications, within the scope of the appended claims, may be made in the design and arrangement of the parts without departing from the spirit of the invention.

What is claimed is:

1. A trailer for carrying a boat comprising a tubular tongue, wheels upon which the tongue is mounted, a hitch connection slidably mounted in the forward end of the tongue, a transversely disposed beam on the ends of which the wheels are mounted, longitudinally spaced transversely disposed saddles carried by the tongue, a clamp with a V-shaped recess therein pivotally connected to the tongue for gripping the bow of a boat positioned on the saddles, clamps spaced at the ends of said beam and positioned to grip sides of a boat positioned on the saddles a telescoping tube having rollers thereon slidably mounted in the trailing end of the tongue, and means for clamping a boat to the tongue.

2. A trailer for carrying a boat comprising a tubular tongue, a transversely disposed beam mounted on the trailing end of the tongue, depending posts carried by extended ends of the beams, resilient elements in said posts, wheels rotatably mounted on lower ends of the posts, a hitch connection slidably mounted in the forward end of the tongue, rollers adjustably mounted on the trailing end of the tongue, transversely disposed boat carrying saddles having resilient covering mounted on the tubular tongue and clamps positioned to engage sides of a boat and also the bow of a boat positioned on the trailer.

3. In a trailer for carrying a boat, the combination which comprises a tubular tongue having a transversely disposed beam on the trailing end, depending posts having resilient elements therein depending from extended ends of the beam wheels rotatably mounted on lower ends of said posts, a hitch connection having a jack knife joint therein slidably mounted in the forward end of the tongue, a telescoping tube having rollers thereon slidably mounted in the trailing end of the tongue, latching means for securing the hitch connection and telescoping tube in adjusted positions in the tongue, transversely disposed saddles having resilient upper surfaces mounted on the tongue, and clamps also mounted on the tongue and positioned to secure a boat in said saddles.

4. In a trailer for carrying a boat, the combination which comprises a tubular tongue having a transversely disposed beam on the trailing end, wheels rotatably mounted on ends of said beam, a hitch connection having a jack knife joint therein slidably mounted in the forward end of the tongue, a telescoping tube having rollers thereon slidably mounted in the trailing end of the tongue, latching means for securing the hitch connection and telescoping tube in adjusted positions in the tongue, transversely disposed saddles having resilient upper surfaces mounted on the tongue, and clamps also mounted on the tongue and positioned to secure a boat in said saddles, said clamping means being pivotally mounted and adapted to fold to nested positions upon the trailer.

5. In a boat trailer, the combination which comprises an elongated tubular tongue having a transversely disposed beam on the trailing end, wheels rotatably mounted in brackets on posts extended downwardly from ends of the transversely disposed beam, a hitch connecting rod having a jack knife joint therein slidably mounted in the forward end of the tubular tongue, pins extended through the tongue and rod for securing the rod in adjusted positions, a telescoping tube having rollers thereon slidably mounted in the trailing end of the tubular tongue, a pin extended through the tongue and telescoping tube for securing the telescoping tube in adjusted positions, transversely disposed saddles positioned on the tubular tongue and transversely disposed beam, rods having threaded upper ends pivotally mounted on the tongue and beam, clamps positioned on upper ends of the rods, elements threaded on the rods for limiting downward movement of said clamps, and wing nuts threaded on upper ends of the rods for retaining the clamps in clamping relation with a boat positioned in said saddles.

References Cited in the file of this patent

UNITED STATES PATENTS

| | | |
|---|---|---|
| 2,485,793 | Vassar | Oct. 25, 1949 |
| 2,497,072 | Cooper | Feb. 14, 1950 |
| 2,613,827 | Van Doorne | Oct. 14, 1952 |
| 2,628,733 | Hale | Feb. 17, 1953 |
| 2,636,745 | Cartwright | Apr. 28, 1953 |
| 2,650,730 | Rohm | Sept. 1, 1953 |
| 2,660,443 | Miller | Nov. 24, 1953 |
| 2,708,045 | Shontz | May 10, 1955 |
| 2,711,259 | Jones | June 21, 1955 |
| 2,713,951 | Davies | July 26, 1955 |